Patented Jan. 1, 1935

1,986,645

UNITED STATES PATENT OFFICE 1,986,645

METHOD OF LUBRICATING AND REDUCING FRICTION

Carl F. Prutton, East Cleveland, Ohio, assignor, by mesne assignments, to The Lubri-Zol Corporation, Cleveland, Ohio, a corporation of Ohio No Drawing. Application October 19, 1932, Serial No. 638,599

8 Claims. (Cl. 87—9)

This invention relates, as indicated, to a method of lubricating and reducing friction between relatively movable metallic surfaces, such as machinery bearings, and is particularly applicable for the lubrication and reduction of friction between the working parts of devices such as internal combustion engines, notably crank shaft bearings and the like.

As has been explained by specialists in this particular field of the art, a lubricant employed for the purpose of reducing friction between relatively movable metallic parts may function in two ways commonly referred to as "thick-film" lubrication and "thin-film" lubrication.

In "thick-film" lubrication the bearing surfaces are completely separated by a relatively thick continuous film of the lubricating composition employed. When friction between the moving parts is measured in this case, the results obtained are independent of all factors except pressure, speed and viscosity of the lubricating composition. A single curve representing all data is found by plotting the coefficient of friction against a function consisting of the product of viscosity and speed divided by pressure per unit area, as long as the value of such function is greater than a definite amount. At this minimum point, reduction of viscosity or speed or increase in pressure results in a rupture of the film of lubricant. Although the value of the coefficient of friction is lowest at the point at which the film is about to fail, the increase in the coefficient for higher viscosity and speed, or lower pressure, is relatively slight. The conditions resulting in "thick-film" lubrication are, therefore, those which result in low friction.

For pressures sufficiently great or for correspondingly low values of viscosity or speed, the film of lubricant, as above indicated, is ruptured, but although such film is ruptured, it is not entirely destroyed and the metallic bearing surfaces are still affected to some extent at least by the presence of the lubricating composition. This condition is commonly referred to as "thin-film" lubrication.

When one of the bearing surfaces is a metal such as bronze or babbitt, seizure does not take place at once but the coefficient of friction increases rapidly to abnormally high values with each slight further increase in pressure or decrease in viscosity or speed. For a given set of bearings, the data obtained for "thin-film" lubrication may be approximately coordinated into a single curve but only on plotting coefficient of friction against the product of viscosity and speed divided by the square root of pressure.

If both bearing surfaces are of steel, seizure or scoring will result almost immediately upon failure of "thick-film" lubrication when a pure mineral oil is the sole lubricating composition employed.

It is among the objects of my invention to provide a method of lubricating and reducing the friction between relatively movable metallic surfaces effective to accomplish the desired ends in an improved manner although the pressure and other factors result in what has been above explained as "thin-film" lubrication and this without materially affecting the coefficient of friction between the parts when the conditions of operation are such as to result in "thick-film" lubrication.

Other objects of my invention will appear as the description proceeds.

To the accomplishment of the foregoing and related ends, said invention, then consists of the steps hereinafter fully described and particularly pointed out in the claims.

The following description sets forth in detail one approved method of carrying out the invention, such disclosed method, however, constituting but one of the various ways in which the principle of the invention may be used.

The method of reducing the friction between relatively moving metallic surfaces which comprises my invention contemplates maintaining between such surfaces a film of lubricating composition including at least one halogenated carbon ring compound. The base of the lubricating composition is some oily material, preferably mineral oil. The halogenated carbon ring compounds added to this oily base are preferably of chlorinated species and particularly the following compounds have been found to produce very satisfactory results, viz:—halogenated, or more specifically, chlorinated benzene compounds, such as mono-chlor-benzene, di-chlor-benzene, notably the ortho compound; chlor-naphthalenes; chlor-di-phenyls; halogenated, or more specifically, chlorinated homologs of the above; chlorinated substituted benzenes such as toluene; chlorinated substituted naphthalenes, such as alpha-methyl-naphthalene; and chlorinated substituted di-phenyls such as phenyl-toluene.

In addition to the above enumerated types of compounds which have been found to produce satisfactory results, it has been found that certain oxygen-containing carbon ring compounds which have been chlorinated and added to a lubricating oil are capable of improving the properties to an even greater extent than certain similar chlorinated hydrocarbons, notably when added in very small amounts. Of the oxygen-containing carbon ring compounds which have been tried, chlorinated di-phenyl oxide (phenyl ether) which contains about 50% chlorine, has been found to produce very satisfactory results. Other chlorinated aromatic ethers and phenols appear to act in a similar manner; also chlorinated aromatic acids and esters.

Since the addition of compounds of the class including the above enumerated reduce viscosity of the oil base to which the same are added, if a large percentage of such compounds are added, there will be a tendency to destroy "thick-film" lubrication because of the reduction in viscosity of the composition. If an excessive quantity of such compounds are added, all the lubrication will then be of the "thin-film" type and therefore produce a decided increase in the total amount of friction developed.

Optimum results are attained by using minimum quantities of these halogenated compounds so that their beneficial effect will not be overshadowed by their detrimental effect reducing the viscosity of the composition.

The method comprising my invention contemplates maintaining between the relatively movable metallic surfaces a film of lubricating composition including less than a total of 20% of at least one halogenated carbon ring compound of the above enumerated class.

The optimum amount of the halogented compound to be employed will depend upon the halogen content of the particular compound, its physical characteristics and especially its effect on the viscosity of the oil to which it is added. The particular use for which the lubricant is intended is also a governing factor in determining the amount of the compound to be added.

For the purpose of lubricating and reducing the friction between the relatively moving parts of an internal combustion engine, such as crank case bearings, piston and cylinder surfaces, as well as piston rings and valves, the method comprising my invention contemplates maintaining between such parts a composition comprising a major proportion of an oily base such as mineral oil and concentrations of from one-half to two per cent of halogenated compounds containing from 50% to 25% of chlorine. If the valve structure of such engine is to be lubricated separately from the remainder of the mechanism or by means acting in an auxiliary fashion, the lubricating composition between the moving surfaces will preferably contain a larger amount of such halogenated compounds, i. e., from two to ten per cent.

The limit of the amount of the halogenated compounds which may be added to an oily base and which will produce improved results by practicing the method comprising my invention, depends upon the reduction in viscosity of the composition caused by the addition of such compounds. Certain of the more viscous compounds, for example, chlorinated di-phenyl containing about 50% chlorine, may be added in amounts exceeding 10% without causing too great a reduction of the viscosity. In any event, the resultant composition will have inferior lubricating properties if the loss of viscosity is too great, as will result from the use of more than 20% of halogenated compounds of any type.

The method comprising my invention, as hereinbefore explained, is characterized by the employment of halogenated carbon ring compounds, i. e., halogenated compounds which will not readily hydrolize in the presence of water, which is usually found to a greater or lesser extent in most, if not all, lubricating compositions.

In the case of oil in actual use in machinery of any kind and particularly in the crank case of internal combustion engines, moisture is always present to some extent and due to condensation may even accumulate to form a separate layer. There is always sufficient water present, therefore, for hydrolysis to take place, particularly when the addition of a chlorinated compound is made to the extent of only a few per cent.

Experiments have shown that when compounds which readily hydrolyze, such as chlorinated open chain compounds, are added to the oily base, hydrolysis will take place to such an extent that the metal parts of any machine being lubricated will be seriously attacked and corroded by the hydrochloric acid generated. On the other hand, the addition of the chlorinated carbon ring compound does not cause corrosion.

The advantage of employing the method comprising my invention for reducing friction between relatively moving metallic surfaces which must be lubricated will be readily apparent from the results of tests which have been conducted under identical conditions in which pure oil; the same type of pure oil to which a halogenated open chain compound, in the form of carbon tetrachloride, was added; and the same type of pure oil to which halogenated carbon ring compounds, in the form of ortho-di-chlor-benzene, had been added. After the completion of each series of tests, the remaining composition was ignited to determine the residue occasioned either by wear or corrosion or both.

The addition of approximately 2% of ortho-dichlor-benzene reduced the amount of ash to about one-half that obtained with pure oil. On the other hand, the addition of the same amount of carbon tetrachloride increased the weight of ash to about four times that obtained with pure oil. The operating temperature of the apparatus indicating the coefficient of friction between the parts was materially reduced by the addition of the chlorinated compound in both cases.

When the method comprising my invention of reducing friction between relatively moving metallic parts is employed, certain advantages are obtained of which the following may be mentioned:—

*First.*—By the use of this method it is possible to extend the pressure range because of the reduced tendency for bearing surfaces to become scored or to seize at higher pressures than are allowable with ordinary lubricants.

*Second.*—The friction is reduced, especially in the higher pressure range below that obtained with ordinary lubricants.

This application is a continuation in part of my copending application, Ser. No. 463,366, filed June 23, 1930.

Other modes of applying the principle of my invention may be employed instead of the one explained, change being made as regards the method herein disclosed, provided the step or steps stated by any of the following claims or the equivalent of such stated step or steps be employed.

I, therefore, particularly point out and distinctly claim as my invention:

1. The method of reducing the friction between relatively moving metallic surfaces which comprises maintaining therebetween a film of lubricating oil and at the same time chemically acting upon such surfaces by means of a halogenated organic ring compound which is present in said oil film in quantities less than about 20%.

2. The method of reducing the friction between relatively moving metallic surfaces which comprises maintaining therebetween a film of lubricating oil and at the same time chemically acting upon such surfaces by means of a chlorinated organic ring compound which is present in said oil film in quantities less than about 20%.

3. The method of reducing the friction between relatively moving metallic surfaces which comprises maintaining therebetween a film of lubricating oil and at the same time chemically acting upon such surfaces by means of a compound of the class including halogen bearing derivatives of benzene, diphenyl and naphthalene, which compound is present in said oil film in quantities less than about 20%.

4. The method of reducing the friction between relatively moving metallic surfaces which comprises maintaining therebetween a film of lubricating oil and at the same time chemically acting upon such surfaces by means of a compound of the class including chlorine bearing derivatives of benzene, diphenyl and naphthalene, which compound is present in said oil film in quantities less than about 20%.

5. The method of reducing the friction between relatively moving metallic surfaces which comprises maintaining therebetween a film of lubricating oil and at the same time chemically acting upon such surfaces by means of a compound of the class consisting of halogen bearing derivatives of benzene.

6. The method of reducing the friction between relatively moving metallic surfaces which comprises maintaining therebetween a film of lubricating oil and at the same time chemically acting upon such surfaces by means of a compound of the class consisting of halogen bearing derivatives of diphenyl.

7. The method of reducing the friction between relatively moving metallic surfaces which comprises maintaining therebetween a film of lubricating oil and at the same time chemically acting upon such surfaces by means of a compound of the class consisting of halogen bearing derivatives of naphthalene which addition agent is present in said oil film in a total quantity of less than about 20%.

8. The method of reducing the friction between relatively moving metallic surfaces which comprises maintaining therebetween a film of lubricating oil and at the same time chemically acting upon such surfaces by means of a halogenated organic ring compound in which substantially all of the halogen present is directly attached to an atom which is part of an organic ring structure and which compound is present in said oil film in quantities less than about 20%.

CARL F. PRUTTON.